United States Patent
Ahire

(10) Patent No.: US 10,482,079 B2
(45) Date of Patent: *Nov. 19, 2019

(54) DATA DE-DUPLICATION SYSTEMS AND METHODS

(71) Applicant: CoreLogic Credco, LLC, Irvine, CA (US)

(72) Inventor: Parag Vijay Ahire, San Diego, CA (US)

(73) Assignee: CORELOGIC CREDCO, LLC, Irvine, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/617,558

(22) Filed: Jun. 8, 2017

(65) Prior Publication Data

US 2017/0270156 A1    Sep. 21, 2017

Related U.S. Application Data

(63) Continuation of application No. 14/549,177, filed on Nov. 20, 2014, now Pat. No. 9,697,248.

(51) Int. Cl.
| | |
|---|---|
| *G06F 17/00* | (2019.01) |
| *G06F 16/23* | (2019.01) |
| *G06N 20/00* | (2019.01) |
| *G06N 5/02* | (2006.01) |
| *G06Q 40/02* | (2012.01) |

(52) U.S. Cl.
CPC ......... *G06F 16/2365* (2019.01); *G06N 5/025* (2013.01); *G06N 20/00* (2019.01); *G06Q 40/025* (2013.01)

(58) Field of Classification Search
CPC .... G06F 17/30371; G06F 17/00; G06F 17/30; G06F 16/2365; G06N 20/00; G06N 5/025

USPC .................................................. 707/600–899
See application file for complete search history.

(56) References Cited

U.S. PATENT DOCUMENTS

| | | | |
|---|---|---|---|
| 5,274,547 A | 12/1993 | Zoffel et al. | |
| 2015/0278258 A1* | 10/2015 | Kienzle | G06F 17/30303 707/692 |

OTHER PUBLICATIONS

Kotsiantis S.B. "Supervised Machine Learning: A Review of Classification Techniques" Informatica Journal of Computing and Informatics, vol. 31, 2007, pp. 249-268.

* cited by examiner

*Primary Examiner* — Issac M Woo
(74) *Attorney, Agent, or Firm* — Xsensus, LLP

(57) ABSTRACT

A system, method, and computer program includes a communications interface configured to receive a set of industry reports from multiple industry sources, and circuitry to compare one or more attributes of at least two trade lines to identify whether the at least two trade lines are duplicates. The circuitry characterizes as a binary indication whether the comparing indicates the one or more attributes are a match, and display a representation of the binary indication and receive a user-identified indication whether the at least two trade lines are duplicates. The circuitry trains a classifier, records the indication whether the at least two trade lines are duplicates and removes at least one of the at least two trade lines from the set of industry reports, and runs the classifier. Subsequently, a supervised machine learning classifier is trained in fit on the training data and is evaluated for accuracy of the testing data.

19 Claims, 10 Drawing Sheets

Fig. 3

True Positive = TP    False Positive = FP

True Negative = TN    False Negative = FN

Sensitivity (True Positive Rate)
TPR = TP / (TP + FN)

Precision (Positive Predictive Value)
PPV = TP / (TP + FP)

Fall-out or False Positive Rate
FPR = FP / (FP + TN)

Specificity (True Negative Rate)
SPC = TN / (FP + TN)

Negative Predictive Value
NPV = TN / (TN + FN)

False Discovery Rate
FDR = FP / (TP + FP)

Accuracy
ACC = (TP + TN) / (TP + FN + FP + TN)

F1 Score
F1 = 2TP / (2TP + FP + FN)

Fig. 4

Results* — Training/Test Set Split

| Classifier | Training time in seconds | RMSD** | Accuracy Score | F1 Score |
|---|---|---|---|---|
| Extra Trees | 8.99 | 0.0266076631593 | 0.9992926135196 | 0.9872283977437 |
| Decision Tree | 59.02 | 0.0268645193487 | 0.9992782976 | 0.9872228297556 |
| Random Forest | 107.29 | 0.0268180440404 | 0.9992607306877 | 0.9872731494237 |
| Gradient Boosting | 137.55 | 0.124563814397 | 0.9844838856143 | 0.7783290318087 |
| Stochastic Gradient Descent (SGD) | 47.07 | 0.0417537622731 | 0.9982566233336 | 0.9692927056076 |
| Naive Bayes | 49.99 | 0.0734770932877 | 0.9946011167626 | 0.9121636381697 |
| Linear Discriminant Analysis (LDA) | 40.98 | 0.0673739468142 | 0.9954607512915 | 0.9229518131577 |

\* 4013 reference numbers
4915460 training samples (60 %)
3276974 test samples (40 %)

\*\* RMSD – Root Mean Squared Deviation

Fig. 5
Results* - 10 Fold Cross Validation

| Classifier | Training time in seconds | Mean** RMSD** | Mean** Accuracy Score | Mean*** F1 Score |
|---|---|---|---|---|
| Extra Trees | | | | |
| Decision Trees | 23.37 | 0.0264072973239 | 0.999291785708 | 0.987526948966 |
| Random Forest | 94.23 | 0.0263078837261 | 0.999296546199 | 0.987612888357 |
| Gradient Boosting | 101.77 | 0.107811808404 | 0.988347785433 | 0.820922304828 |
| Stochastic Gradient Descent (SGD) | 5.93 | 0.0416861504124 | 0.998255707082 | 0.968847965784 |
| Naive Bayes | 9.48 | 0.0726092810683 | 0.994687172048 | 0.913526261732 |
| Linear Discriminant Analysis (LDA) | 40.21 | 0.0657151622358 | 0.995627918116 | 0.925941219721 |

\* 4013 reference numbers
7373190 training samples
0819243 test samples

\*\* RMSD – Root Mean Squared Deviation
\*\*\* Mean Values reported across 10 folds

Fig. 6

Sample Metrics – Random Forest Classifier

True Positive = 91422 (TP)
True Negative = 3183195 (TN)
False Positive = 1895 (FP)
False Negative = 462 (FN)

<u>Sensitivity (True Positive Rate)</u>
TPR = TP / (TP + FN) = 91422 / (91422 + 462) = 0.99497192

<u>Specificity (True Negative Rate)</u>
SPC = TN / (FP + TN) = 3183195 / (1895 + 3183195) = 0.99940504

<u>Precision (Positive Predictive Value)</u>
PPV = TP / (TP + FP) = 91422 / (91422 + 1895) = 0.97969287

<u>Negative Predictive Value</u>
NPV = TN / (TN + FN) = 3183195 / (3183195 + 462) = 0.99985488

<u>Fall-out or False Positive Rate</u>
FPR = FP / (FP + TN) = 1895 / (1895 + 3183195) = 0.000594959640

<u>False Discovery Rate</u>
FDR = FP / (TP + FP) = 1895 / (91422 + 1895) = 0.02030712

<u>Accuracy</u>
ACC = (TP + TN) / (TP + FN + FP + TN) = (91422 + 3183195) / (91422 + 462 + 1895 + 3183195) = 3274617 / 3276974 = 0.999280738876

<u>F1 Score</u>
F1 = 2TP / (2TP + FP + FN) = 2 * 91422 / (2 * 91422 + 1895 + 462) = 182844 / 185201 = 0.987727329

Fig. 7

- Sample Execution

Attempting the Gradient Boosting Classifier!!
Start Time = 2014-08-07 16:57:48.434288

Completed reading training data set!!
Time spent in reading training data/result set: 70.51553875245997

Completed reading of test data set!!
Time spent in reading test data/result set: 45.118672551647211

Completed fitting Gradient Boosting Classifier!!
Time spent in fitting Gradient Boosting Classifier: 109.54199678433348

Completed predicting classes as per fitting by Gradient Boosting Classifier!!
Time spent in predicting Gradient Boosting Classifier: 35.636414963841961

Completed predicting probability as per fitting by Gradient Boosting Classifier!!
Time spent in predicting the probability as per fitting by Gradient Boosting Classifier: 40.417126011953314

Completed saving predicted probability as per fitting by Gradient Boosting Classifier!!
Time spent in saving the predicted results as per fitting by Gradient Boosting Classifier: 62.487571264995611

Prediction Score = 0.999280738877
Time spent in calculating the prediction score as Gradient Boosting Classifier: 33.93289744898158
End Time = 2014-08-07 17:04:24.133913

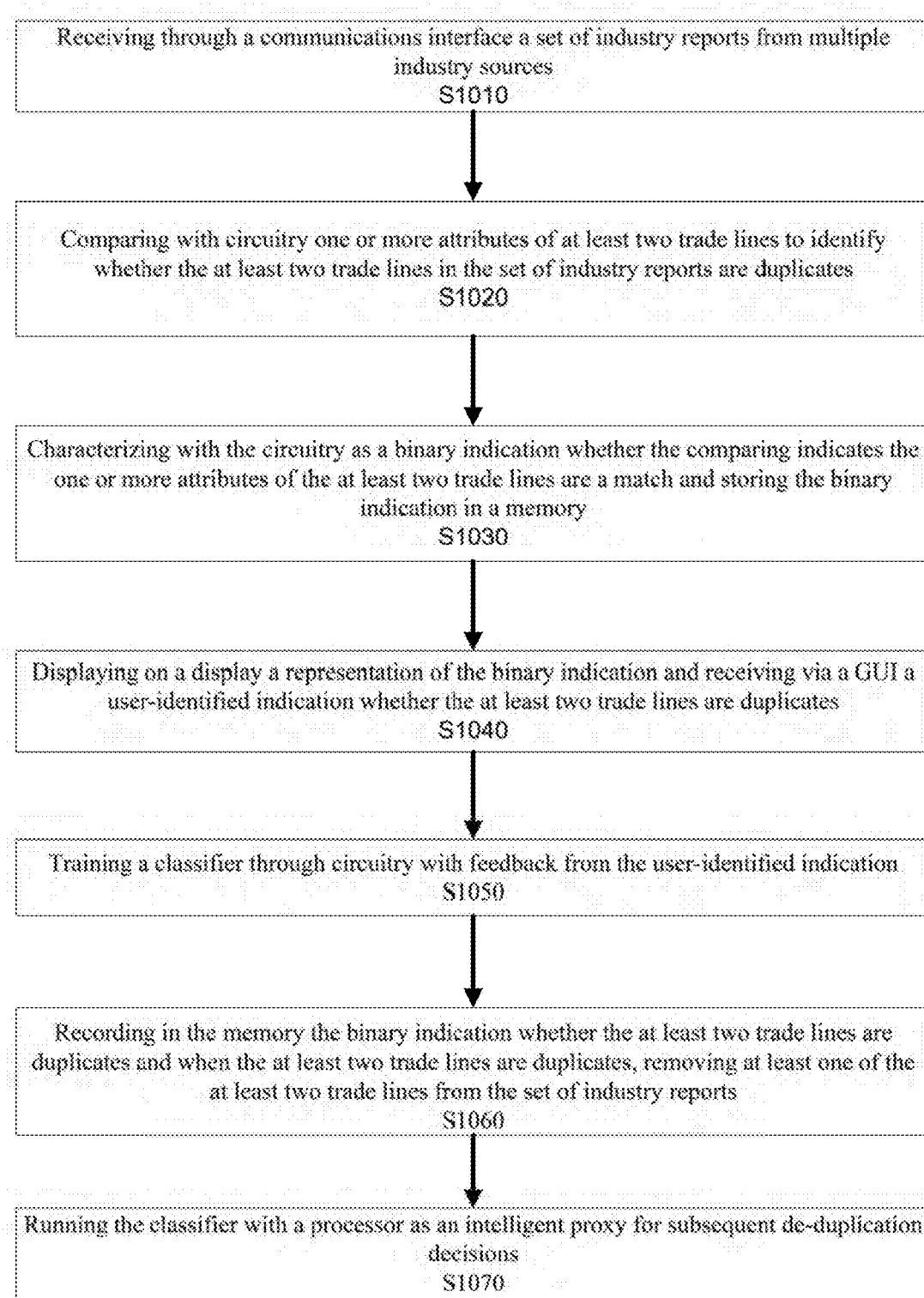

DATA DE-DUPLICATION SYSTEMS AND METHODS

CROSS REFERENCE TO RELATED APPLICATION

This application is a continuation of U.S. application Ser. No. 14/549,177 filed on Nov. 20, 2014, which is incorporated in us entirety by reference herein.

BACKGROUND

Field of the Disclosure

The disclosure herein relates to systems, methods, and computer program products for de-duplication of data. Supervised machine learning methods, systems, and computer program products of data de-duplication are described.

Description of the Related Art

The background description provided herein is for the purpose of generally presenting the context of the disclosure. Work of the presently named inventor, to the extent it is described in she background section, as well as aspect of the description which may not otherwise quality as prior art at the time of filing, are neither expressly nor impliedly admitted as prior art with respect to the present invention.

De-duplication of data, i.e. elimination of duplicate data has become increasingly important with the exponential growth of available data. Data can be valuable when it is organized and streamlined. In contrast, data dumping without organization results in wasted resources looking for the useful data in an electronic warehouse of non-useful and/or duplicate data. This can result in multiple versions of the same data being retained or other data being completely dropped amongst the volume of data.

Attempts have been made in industry to merge data, wherein the data is gradually blended in stages to blur a distinction between the different groups of data. Methods and systems currently used include "blend," "pick and choose," and "list & stack." Blend data is blended from a group of duplicates to form a single record. Pick and Choose data is a record picked from a list of duplicates. List and Stack data is a blended record, along with the individual duplicate records from which the blended record was built. Pick and Choose methodology compares the constituent data elements.

When there's a discrepancy, the Pick and Choose methodology defaults to one credit element, usually the most derogatory. Since the data selected may not be the most current or provide a fair representation of the consumer's credit history, this method slows or stops the credit evaluation process while the data is reviewed by lending and financial specialist. In contract, List and Stack methodology lists all of the data received from the credit bureaus, leaving it to lending and financial specialists to manually sort and determine duplications and discrepancies. Since the List and Stack method relies on human interpretation, it can slow the evaluation process, produce a skewed result, and/or limit consistency in decision making. A blend of data on the other hand provides the most accurate data for each element, providing businesses with a more balanced and fair credit picture of the consumer. However, there are many different implementations of these, as well as other methods and systems of de-duplication, wherein each implementation produces different results.

Multiple credit bureaus are an example in which data from each bureau is merged to form a single cohesive report. The first third-party credit reporting agencies were established in the early 1830s. These agencies eventually came to function much like modern-day franchises, with a national scope. These agencies are presently recognized as being dominated by three major credit bureaus: EquiFax, Experian (formerly TRW), and TransUnion. These credit bureaus provide a credit report which is a record of credit activities for individuals. The credit reports list any credit-card accounts or loans that an individual may have, as well as balances and how regularly the individual makes payments. In addition, the credit reports indicate whether any action has been taken against the individual because of unpaid bills.

There are five major components to a conventional credit report. A first component includes personal identifying information, such as name, address (current and previous), social security number, and optionally telephone number, birth date, and current and previous employers.

A second component of the credit report includes credit history, which includes a section on bill paying history with banks, retail stores, finance companies, mortgage companies, and other entities that have granted credit to the individual. This credit history includes information about each account the individual has, such as when it was opened, what type of account it is, how much credit is granted on the account, and what is the monthly payment that is due. If the account is closed or the loan has been paid off, that information will be included in the report as well.

A third component of the credit report may include credit worthiness with regard to tax liens, court judgments, and bankruptcies. Other public records related to credit worthiness can be included.

A fourth component of the credit report may include report inquiries which list all credit grantors who have received a copy of the credit report within a specified timeframe, and other authorized entities that have viewed the credit report. In addition, the credit reporting system track the companies that have received the name and address in order to offer the individual a firm offer of credit.

A fifth component of the credit report may include consumer statements that, among other things, include disputes that the individual may have made regarding the report following reinvestigation. Both the consumer and the creditor may make statements on the report. Each of the three major credit bureaus gets its information because they serve as clearinghouses for credit information about customers.

In addition to the three national credit bureaus, there are several hundred or thousands of local and regional credit bureaus around the country that obtain in Son nation directly from the individual's creditors. These smaller local and regional bureaus are typically affiliated with one of the three national credit bureaus.

The activities of all credit bureaus are governed by the Fair Credit Reporting Act, which is a U.S. federal law (35 U.S.C. § 1681) that regulates the collection, dissemination, and use of consumer credit information. The Fair Credit Reporting Act places strict requirements on the consumer credit reporting agencies. For example, the nationwide consumer credit reporting agencies must make available to consumers information about them contained in the agency's flies, upon request and at no charge at least once per year. Also, if negative information is removed as a result of a consumer's dispute, it may not be reinserted (after verification) without notifying the consumer within five days in writing. Also, the consumer reporting agencies may not retain negative information for an excessive period. For example, the Fair Credit Reporting Act places restrictions on how long negative information, such as late payments, bankruptcies, liens, or judgments may stay on a consumer's credit report, which is typically seven years from the date of delinquency. One exception is bankruptcies, which may stay on the record for ten years, and tax liens which may stay on the record seven years from the time they are paid.

Many products and services are provided on the basis of an agreement or expectation that the consumer will make one or more future payments. For example, in the case of a mortgage, auto loan, credit card, installment payment plan, or medical procedure, the consumer receives a product or service with the expectation that they will pay for it (possibly with interest) in the future. In the case of an auto lease or apartment rental, the consumer receives the use of a product, and the arrangement will only be beneficial to the provider of the product if the consumer pays for the use of the product for a minimum period of time. In such cases, the provider ("lender") of the product or service would like to be able to ascertain the consumer's ability and likelihood to pay in the future. This need has led to the establishment of the above-described credit bureaus that collect data about consumers and furnish credit reports, credit attributes, and credit scores that lenders can use to decide whether to provide the product or service and terms of providing the product or service (risk-based pricing).

Service providers can also use credit information for account management, for example in deciding whether to increase the amount, of a line of credit, to modify loan parameters, or to provide promotion/retention offers. Also, credit information is sometimes used in other areas such as employment and security clearance decisions, where credit risk is thought to be correlated with other behavioral risk.

FIG. 1 shows a schematic view of a conventional credit report 10. The credit report 10 among other things includes personal identifying information, such as name, address, social security number, telephone number, birth date, and present and previous employers. This information is presented as personal identifying information 11. The credit history 12 is also reported and includes a section regarding bill-paying history with banks, retail stores, etc. The credit history also indicates what entities have granted credit to the individual, and includes information about each account presently opened and formerly opened by the individual, and paid obligations for a specified timeframe. Public records 13 include information regarding credit worthiness, such as tax liens, court judgments, and bankruptcies. Report inquiries 14 include all credit grantors who have received a copy of the credit report 10 within a specified timeframe. It also includes any others who are authorized to view the credit report 10. Dispute statements 15 include a summary of statements made, such as disputing information on the credit report 10.

Credit attributes within a credit report from a credit bureau can be compared to credit attributes within a credit report of another credit bureau to create a blended credit report by de-duplicating data and performing a blend of credit data. Credit attributes include, but are not limited to trade lines, public records, inquiries, addresses, fraud reports, and directory items. One approach of de-duplicating a trade line includes evaluating the similarity based on matching a number of additional attributes, including an account number (AN1, AN2, AN3 . . . ), an account type (AT), the date the account opened (DO), data repository sources (DR, SR), high credit (HC), a lost or stolen indicator (LS), the bureau identity (ID), subscriber information (CN), the balance (BL), the payment amount (MP), and the credit limit (CL). Each individual attribute value is compared across two trade lines to arrive at a binary decision of similarity or dissimilarity. An index is assigned to each individual feature to arrive at a total index. A value of 0 is added to the total index when the individual feature does not match and a value of 1 is added to the total index when the individual feature matches. The table below illustrates individual indices and a total index for the attributes listed above.

| Index Table | | | | | | | | | | | | | | |
| --- | --- | --- | --- | --- | --- | --- | --- | --- | --- | --- | --- | --- | --- | --- |
| AN1 | AN2 | AN3 | AT | DO | SR | HC | DR | LS | ID | SS | CN | BL | MP | CL |
| $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| 16384 | 8192 | 4096 | 2048 | 1024 | 512 | 256 | 128 | 64 | 32 | 16 | 8 | 4 | 2 | 1 |

The total index is evaluated as the sum of the indices for each of the individual attributes. For the table illustrated above, the maximum total index=1+2+4+8+16+32+64+128+256+512+1024+2048+4096+8192+1684=32,767. A lookup is then performed in a lookup table to obtain a resultant indicator of a match or non-match based on the total index used as a displacement within the decision rule table.

In addition to the trade line comparisons and the index computations described above, there are multiple rule files to consider for collections, non-collections, and conditional rules, wherein a conditional rule can confirm or negate a previous decision. Newer features can also be implemented in code rather than a decision matrix, which results in a modified merge index decision over ridden with exception files. Also, changes can be made to the merge index decision based on reactionary customer complaints, which require a full release or regression.

As illustrated in the index table above and as per the contents of the decision matrix, there is a heavy reliance on an account number match. As an example, a collection trade line can require at least a 90% match of the account number. As a result, there may only be a 5% positive indication. In a non-collection trade line, a 30% match of the account number may be required, which can result in a 25% positive indication. However, a credit human mandate requires an account number suppression, which greatly affects a collection trade line by placing more emphasis on less reliable trade line comparisons.

Current approaches based on a manual decision for a particular index within a decision table results in only the most likely locations being updated with a positive match for the decision value. This arises because of the limitation of a human to comprehend the entire address space of 15 feature vector. The decision table is thus sparsely populated with positive match values.

SUMMARY

In one embodiment, a computer-implemented method of de-duplicating data from industry reports is described. The method includes receiving through a communications interface a set of industry reports from multiple industry sources, and comparing with circuitry one or more attributes of at least two trade lines to identity whether the at least two trade tines in the set of industry reports are duplicates. The method also includes characterizing with the circuitry as a binary indication whether the comparing indicates the one or more attributes of the at least two trade lines are a match and storing the binary indication in the memory. The method also includes displaying on a display a representation of the binary indication and receiving via a graphical user interface (GUI) a user-identified indication whether the at least two trade lines are duplicates. The method also includes training a classifier through circuitry with feedback from the user-identified indication, the classifier being a computer-implemented classifier. The method also includes recording in memory the indication whether the at least two trade lines are duplicates and when the at least two trade lines are duplicates, removing at least one of the at least two trade lines from the set of industry reports so as to de-duplicate a portion of the at least two trade lines. The method also includes running the classifier with a processor as an intelligent proxy for subsequent de-duplication decisions.

In another embodiment, a supervised machine learning de-duplication system is described. The system includes a communications interface configured to receive a set of industry reports from multiple industry sources. The system also includes processing circuitry configured to compare one or more attributes of at least two trade lines to identify whether the at least two trade lines in the set of industry reports are duplicates. The processing circuitry is also configured to characterize as a binary indication whether the comparing indicates the one or more attributes of the at least two trade lines are a match and store in memory the binary indication. The processing circuitry is also configured to display a representation of the binary indication and receive via a graphical user interface (GUI) a user-identified indication whether the at least two trade lines are duplicates. The processing circuitry is also configured to train a classifier with feedback from the user-identified indication, the classifier being a computer-implemented classifier. The processing circuitry is also configured to record in memory the indication whether the at least two trade lines are duplicates and remove at least one of the at least two trade lines from the set of industry reports so as to de-duplicate a portion of the at least two trade lines. The processing circuitry is also configured to run the classifier with a processor as an intelligent proxy for subsequent de-duplication decisions.

In another embodiment, a non-transitory computer-readable storage medium having stored thereon computer-readable instructions that when executed by circuitry performs a method of de-duplicating data. The method includes receiving through a communications interface a set of industry reports from multiple industry sources, and comparing with circuitry one or more attributes of at least two trade lines to identity whether the at least two trade lines in the set of industry reports are duplicates. The method also includes characterizing with the circuitry as a binary indication whether the comparing indicates the one or more attributes of the at least two trade lines are a match and storing in the memory the binary indication. The method also includes displaying on a display a representation of the binary indication and receiving via a graphical user interface (GUI) a user-identified indication whether the at least two trade lines are duplicates. The method also includes training a classifier through circuitry with feedback from the user-identified indication, the classifier being a computer-implemented classifier. The method also includes recording in memory the indication whether the at least two trade lines are duplicates and removing at least one of the at least two trade lines from the set of industry reports so as to de-duplicate a portion of the at least two trade lines. The method also includes running the classifier with a processor as an intelligent proxy for subsequent de-duplication decisions.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a table illustrating terms and equations according to one embodiment;

FIG. 4 is a table illustrating results for seven classifiers according to one embodiment:

FIG. 5 is a table illustrating results for seven classifiers in a 10-fold cross-validation process according to one embodiment;

FIG. 6 illustrates results for a Random Forest Classifier according to one embodiment;

FIG. 7 illustrates a sample execution for trade line de-duplication according to one embodiment;

FIG. 10 is an exemplary flow chart for a method of de-duplicating data according to one embodiment.

DETAILED DESCRIPTION OF THE EMBODIMENTS

Figure 1:
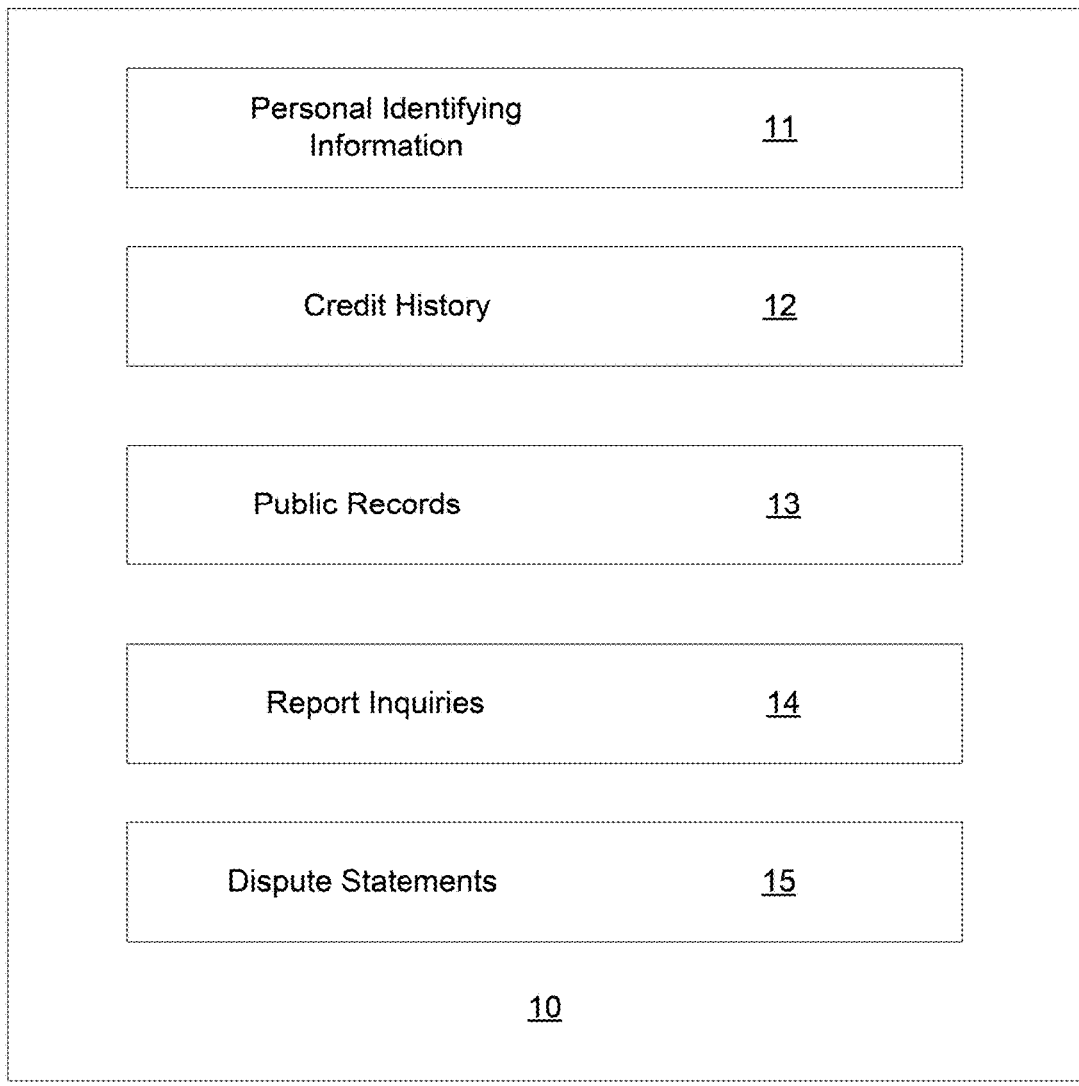
FIG. 1 is a schematic diagram of a credit report according to one embodiment.

Merging of data can occur in two stages, wherein one stage is within an organization and another stage is across different organizations. In addition, each stage attempts to identify duplicate entries of data, blend the data, and eliminate duplicate entries of data.

Merging of data, including de-duplication of data can be used in many different types of industries in order to organize and streamline data to make it more useful. Those industries include, but are not limited to financial markets, credit bureau reporting, file archiving, indexing, census reporting, inventories, and research.

In a credit bureau merged report, multiple bureau reports are merged into a single report to be more useful and compact for such purposes as financial lending and investment. However, several short comings exist with current trade line comparison methods and systems as described above. The current trade line comparison methods and systems follow explicitly programmed instructions, requiring consideration of each conceivable scenario that might possibly be of importance. These scenarios typically grow exponentially with every new feature being added.

Embodiments described herein include systems and methods that learn from data, as opposed to following explicitly programmed instructions of current methods and systems. A supervised learning system is presented with example inputs and desired outputs to learn a general rule to map future inputs to outputs.

Embodiments for trade line de-duplication utilize statistical classification to identify which set of categories or sub-populations in which a new observation belongs. This is determined on the basis of a training set of data containing observations or instances in which the category is known. As an example, a particular email could be assigned to a "spam" or "non-spam" class. Another example is assigning a diagnosis to a patient based upon observed characteristics of the patient. For purposes of machine learning, classification is considered to be supervised learning when a training set of correctly identified observations is available to be learned. Unsupervised learning includes clustering, which involves grouping data into categories based on a measure of inherent similarity or distance. In binary classification, only two classes are involved in determining the category of a particular observation, i.e. the observation is a match or a non-match.

Supervised learning is a machine learning task of inferring a function from labeled training data, wherein the training data contains a set of training examples. Each example is a pair of an input object and a desired output value. In one embodiment, the input object can be a vector, and the output value can be a supervisory signal. A supervised learning algorithm analyzes the training data and produces an inferred function, which can be used to map new examples. The objective of the algorithm is to correctly determine the class labels for unseen instances. This requires the learning algorithm to generalize from the training data towards unseen situations in a reasonable way. This is analogous to concept learning for humans.

A supervised learning algorithm is given a set of N training examples of the form $[(x_1, y_1), \ldots, (x_N, y_N)]$, where $x_i$ is the feature vector of the $i^{th}$ example and $y_i$ is its label or class. A learning algorithm seeks a function g where X is the input space and Y is the output space. The function g is an element of some space of possible functions G, usually called a hypothesis space. An empirical risk minimization seeks a function that will best fit the training data. A structural risk minimization includes a penalty function to control a bias and variance tradeoff. For both minimizations, it is assumed the training set contains a sample of independent and identical distributed pairs, $(x_i, y_i)$. In order to measure how well a function fits the training data, a loss function is defined and its value is predicted.

A supervised learning approach is suited to predict newer outcomes and is resistant to variations. It learns to recognize outcomes. In one embodiment, 60% of the data is training data and 40% of the data is test data. In another embodiment, a k-fold cross validation can be used, where k is a variable. Cross-validation is a model validation technique for assessing how the results of a statistical analysis will generalize an independent data set to estimate how accurately a predictive model will perform in practice. A model is usually given a dataset of known data on which training is run, i.e. training dataset and a dataset of unknown data or first seen data against which the model is tested in a testing dataset. The objective of cross validation is to define a dataset to test the model in the training phase, i.e. the validation dataset. One round of cross-validation involves partitioning a sample of data into complementary subsets, perform the analysis on a training set and validate the analysis on the validation or testing set. To reduce variability, multiple rounds of cross-validation, i.e. k-fold are performed using different partitions, and the validation results are averaged over the rounds.

Supervised machine learning overcomes many drawbacks of other systems and methods. A database of outcomes for a wide range of samples made by a human in conjunction with other tools provides a benchmark for measuring false positives and false negatives. This results in generated metrics of precision, recall, accuracy score, and F1 score. These metrics can also be used when enhancements are made or new features are added to the system.

In an example of human supervised learning, a set of credit raw bureau files were anonymized. The predicted outcome based on the current implementation was extracted for each pair of trade lines being compared within and across each of the credit files. A human decision was captured for each pair of likely candidates for de-duplication. The user was also given a hint of what the system considered as the outcome, which the user could override. Such overrides could be re-verified by a supervisor before being accepted as a modified outcome. This allowed a capture of false positives and false negatives, which reduced the manual effort of training and testing data. Supervised machine learning classifiers can be trained using this data. Outcome results can be gathered on the test data, which allows gathering the same metrics again to prove whether or not the supervised learning classifiers are better or worse than existing systems and methods. Predictions are made based on test data, which are calibrated against a test target.

Figure 2:
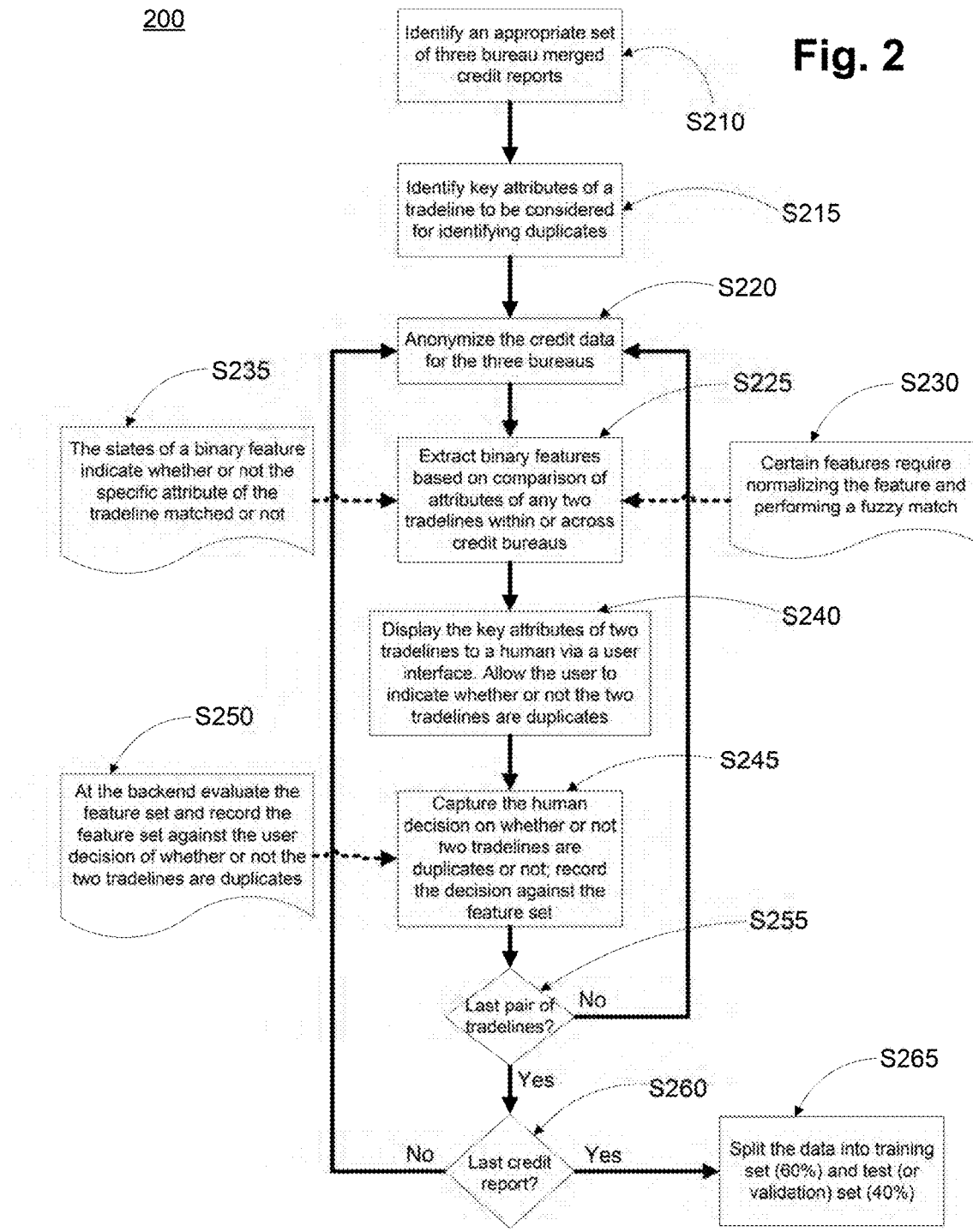
FIG. 2 is an exemplary flow diagram of an algorithm according to one embodiment.

Embodiments described herein implement or incorporate methods and systems of machine learning from previous data. A computing system is presented with example inputs and desired outputs, which results in a computer-generated general rule to map future inputs to future outputs. FIG. 2 is an exemplary flow chart 200 for art algorithm of trade line comparison and merging, which records the features and human-assisted decisions based on the sample data.

A set of merged credit reports is identified in step S210, One embodiment includes three primary credit bureaus identified above. However, any number of credit bureaus is contemplated by embodiments described herein. Key attributes of a trade line to be considered for identification of duplicates are identified in step S215. The credit data for each bureau is anonymized in step S220.

Binary features are extracted in step S225, based on a comparison of attributes of any two trade lines within or across the bureaus. Certain binary features require normalizing and performing a fuzzy match in step S230, which is considered in conjunction with step S225. The states of a binary feature indicate whether or not the specific attribute of the trade line matches or not in step S235, which is considered in conjunction with step S225.

The key attributes of two trade lines are displayed to a human via a graphical user interface in step S240. The user indicates whether or not the two trade lines are duplicates. The human decision on whether or not the two trade lines are duplicates is captured and recorded against the feature set in step S245. At a backend, the human recorded decision is evaluated in step S250 in conjunction with step S245.

Steps S220 through S250 are repeated for every pair of trade lines within and across bureaus. In step S255, a decision is made to determine whether the last pair of trade lines has been considered. If the last pair of trade lines has been considered (a "yes" decision in step S255), the process continues to step S260. If the last pair of trade lines has not been considered (a "no" decision in step S255), the process returns to step S220 to go through steps S220 through S250 again.

Steps S220 through S255 are repeated for all credit bureau reports. In step S260, a decision is made to determine whether the last credit report has been considered. If the last credit report has been considered (a "yes" decision in step S260), the process continues to step S265. If the last credit report has not been considered (a "no" decision in step S260), the process returns to step S220 to go through steps S220 through S255 again. In step S265, the data is split into a training set and a test or validation set. In one embodiment, the training set contains 60% of the data and the test or validation set contains 40% of the data. However, other proportions of training set data and validation set data can be used.

To summarize the steps of FIG. 2, a supervised machine learning classifier is trained to fit a model based on training data. The training data is generated from human interpretation of whether or not two trade lines are identical. The training data is gathered based on a comparison of all trade lines within a credit report of a Cartesian product based selection. A human determines whether or not a key attribute of two trade lines is identical. A decision is made about the two trade lines themselves being identical. This procedure is executed through all trade line comparisons for all credit reports of a given batch. The results are gathered and split into two sets of training data and testing data. The training data is run through a classifier. The entire training data can be used to fit the classifier via a k-fold cross validation, such as a 10-fold cross validation. The testing data is used to gather metrics of the accuracy of the classifier.

Trade line de-duplication includes gathering observations and gathering new features to add to existing features. A number of classifiers are available in which to best fit the data and achieve optimum results. The following classifiers were tested for de-duplication of trade lines of multiple credit bureaus. However, embodiments described herein are not restricted to any of these classifiers. In addition, different classifiers may be better suited for purposes other than de-duplication of trade lines of multiple credit bureaus.

One classifier is an Extra Trees Classifier, which is a randomized tree classifier. The best split to separate samples of a node into two groups is determined. Random splits are drawn for each randomly selected feature, and the best split is chosen from amongst those. When a maximum feature is set to one, a totally random decision tree results.

Another classifier is a Random Forest Classifier. A random forest is an ensemble of decision trees in which each base classifier is grown using a random effect. In one example, a feature is randomly chosen and each node is split. For a small number of features, a linear combination of features can be created and splits selected from the enhanced feature set. In another example, splitting features can be selected completely at random. In fitting a random forest to the data, an out-of-bag error for each data point is recorded and averaged over the forest. In an alternative embodiment, errors on an independent test set can be substituted for bagging. To measure the importance of a $j^{th}$ feature after training, the values of the $j^{th}$ feature are permuted among the training data and the out-of-bag error is again computed on the perturbed data set. The importance score for the $j^{th}$ feature is computed by averaging the difference in the out-of-bag error before and after the permutation over all of the trees. The score is normalized by the standard deviation of these differences. Features which produce large values for this score are ranked as more important than features which produce small values.

A Naïve Bayes Classifier assumes the value of a particular feature is unrelated to the presence or absence of any other feature. As an example, a fruit may be considered to be an apple if it is red, round, and about 3" in diameter. A Naïve Bayes Classifier considers each of these features to contribute independently to the probability that this fruit is an apple. In many applications, parameter estimation for naïve Bayes models uses the method of maximum likelihood. An advantage of naïve Bayes is a small amount of training data is required to estimate the parameters necessary for classification. Since independent variables are assumed, only the variances of the variables for each class need to be determined.

A Decision Tree Classifier uses a decision tree us a predictive model to map observations about an item to conclude the item's target value. In the tree structures, leaves represent class labels and branches represent conjunctions of features that lead to the class labels. A decision tree is a tree in which each internal (non-leaf) node is labeled with an input feature. The arcs coming from a node labeled with a feature are labeled with each of the possible values of the feature. Each leaf of the tree is labeled with a class or a probability distribution over the classes. A tree can be "learned" by splitting the source set into subsets based on an attribute value test. The process is repeated on each derived subset in a recursive manner (recursive partitioning). The recursion is completed when the subset at a node has all the same value of the target variable or when splitting no longer adds value to the predictions.

Gradient Boosting is a machine learning technique for regression problems which produces a prediction model in the form of an ensemble of weak prediction models, such as decision trees. Gradient boosting combines weak learners into a single strong learner in an iterative fashion. The goal is to learn a model F that predicts values y'=F(x), minimizing the mean squared error $(y'-y)^2$ to the true values y (averaged over a training set). At each stage of Gradient Boosting, it can be assumed there is an imperfect model $F_m$. The Gradient Boosting algorithm does not change F; instead, it improves on it by constructing a new model that adds an estimator to provide a better model.

Stochastic Gradient Descent is an optimization method for minimizing an objective function that is written as a sum of differentiable functions. A true gradient is approximated by a gradient at a single example. As the algorithm sweeps through the training set, it performs an update for each training example. Several passes can be made over the training set until the algorithm converges. The data can be shuffled for each pass to prevent cycles. An adaptive learning rate can be used so that the algorithm converges.

Linear Discriminant Analysis is a pattern recognition and machine learning process to find a linear combination of features that characterize or separate two or more classes of objects or events. The resulting combination can be used as a linear classifier. A dependent variable is expressed as a linear combination of other features or measurements. Linear Discriminant Analysis has continuous independent variables and a categorical dependent variable, i.e. the class label. Linear Discriminant Analysis models the difference between the classes of data.

The seven classifiers described above were compared for trade line de-duplication of multiple merged credit bureau reports. FIG. 3 is a table illustrating terms and equations that are used throughout embodiments described herein.

FIG. 4 is a table illustrating results for the seven classifiers described above for a training set of 60% of the data and a test set of 40% of the data. Results for the training time, the root-mean-squared deviation, the accuracy score, and the F1 score are given for each classifier. Definitions and equations used for these results are illustrated in FIG. 3. FIG. 4 illustrates that the Extra Trees, Decision Tree, and Random Forest Classifiers have a small deviation, whereas the Gradient Boosting Classifier has a large deviation. The accuracy scores of all classifiers are relatively high. However, the Extra Trees, Decision Tree, and the Random Forest classifiers scored the highest. These three classifiers also scored the highest F1 score, where an F1 score of one is the highest achievable score and denotes the most reliable results.

FIG. 5 is a table illustrating results for the seven classifiers in a 10-fold cross-validation process. Results for the 10-fold cross-validation process are similar to the training and test set split, wherein the Extra Trees, the Decision Trees, and the Random Forest Classifiers showed the highest results, while the Gradient Boosting Classifier showed the lowest results.

FIG. 6 illustrates specific results for the Random Forest Classifier. FIG. 6 illustrates a low number of false positives and false negatives, relative to the total number of results. This results in high accuracy and high F1 scores. Based on a pool of 4.91 million samples, the Random forest Classifier completed the process in approximately ten minutes. It took 84 seconds to predict 3.27 million samples, which translates to 26.63 micro seconds per prediction.

FIG. 7 illustrates a sample execution for trade line de-duplication of multiple merged credit bureau reports, using a Gradient Boosting classifier. The Gradient Boosting Classifier reads the training data set, reads the test data set, fits the classifier, and predicts classes that will fit the classifier, predicts the probability of each fit, saves the predicted probabilities, and calculates the prediction score. The total time was 17:04:24.133913-16:57:46.434288, or approximately six minutes and forty seconds.

Figure 8:
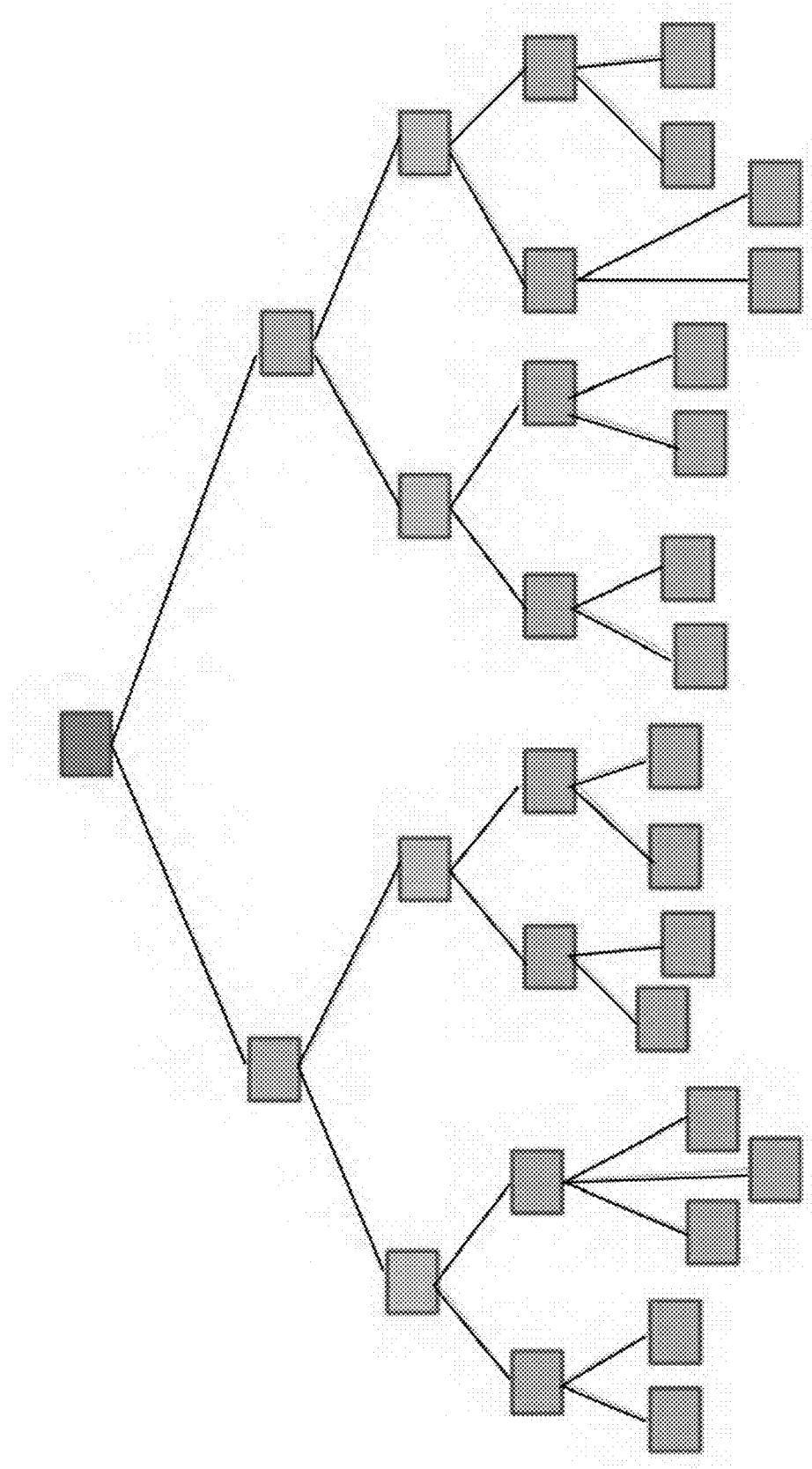
FIG. 8 illustrates a decision tree output according to one embodiment.

FIG. 8 illustrates a simplified decision tree output according to embodiments described herein. An actual decision tree output will likely be much wider with hundreds or thousands of individual boxes. For a given feature, each box compares a number of samples based on a probability of having a match. An error rate is also included in each box, which leads to other connected boxes. The decision tree will ultimately arrive at a result.

An example of a model is given below for exemplary purposes only.
6    [label="error=0.0000\nsamples=22507\nvalue=[22507.0.]", shape="box"];
5→6;
7    [label="X[13]<=0.5000\nerror=0.0002752546053\nsamples=7265\nvalue=[7.26400000e+03  1.00000000e+00]", shape="box"];
5→7;
8 [label="error=0.0000\nsamples=3745\nvalue=[3745.0.]", shape="box"];
7→8;
9    [label="X[1]<=0.5000\nerror=0.000568020402893\nsamples=3520\nvalue=[3.51900000e+03  1.00000000e+00]", shape="box"];
7→9;
10    [label="error=0.0000\nsamples=1407\nvalue=[1407.0.]", shape="box"]

The Extra Trees Classifier can be used to fit a number of decision trees on various sub-samples of the dataset. Averaging can be used to improve the predictive accuracy and to control over-fitting to the data.

Figure 9:
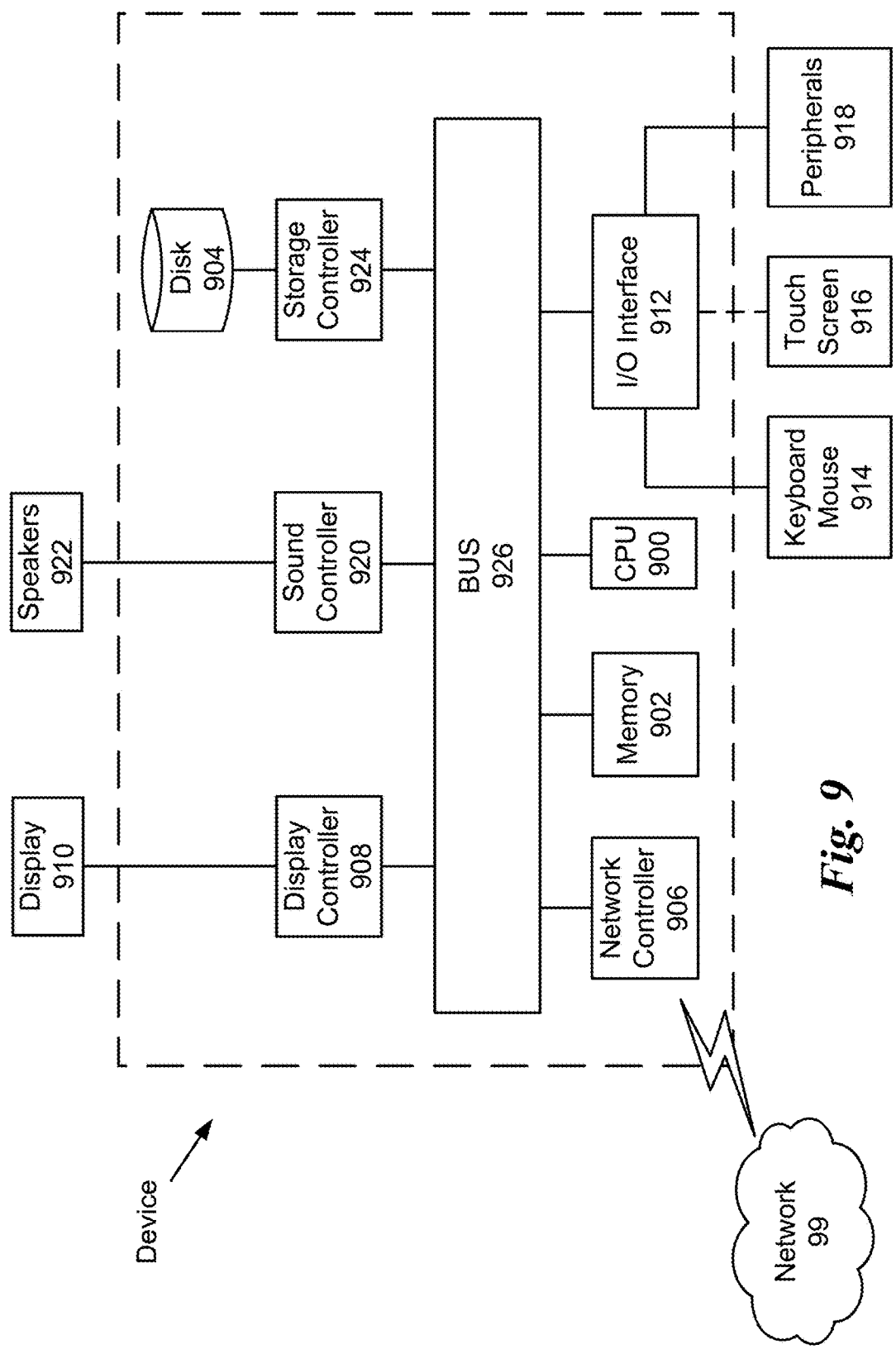
FIG. 9 illustrates a computing device according to one embodiment.

A hardware description of a computing device used in accordance with exemplary embodiments is described with reference to FIG. 9. In FIG. 9, the computing device includes a CPU 900 which performs the processes described above. The process data and instructions may be stored in memory 902. These processes and instructions may also be stored on a storage medium disk 904 such as a hard drive (HDD) or portable storage medium or may be stored remotely. Further, the claimed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

Further, the claimed embodiments may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computing device in FIG. 9 also includes a network controller 906, such us an Intel Ethernet PRO network interface card from Intel Corporation of America, for interfacing with network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadra graphics adaptor from NVIDIA Corporation of America for interfacing with display 910, such as a Hewlett Packard HPL2445w LCD monitor. A general purpose I/O interface 912 interlaces with a keyboard and/or mouse 914 as well as a touch screen panel 916 on or separate from display 910. General purpose I/O interface 912 also connects to a variety of peripherals 918 including printers and scanners, such as an OfficeJet or DeskJet from Hewlett Packard.

A sound controller 920 is also provided in the computing device, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

FIG. 10 is an exemplary flow chart for a method 1000 of de-duplicating data from industry reports. The method 1000 includes step S1010 for receiving through a communications interface a set of industry reports from multiple industry sources. Step S1020 includes comparing with circuitry one or more attributes of at least two trade lines to identity whether the at least two trade lines in the set of industry reports are duplicates. Step S1030 includes characterizing with the circuitry as a binary indication whether the comparing indicates the one or more attributes of the at least two trade lines are a match and storing the binary indication in a memory. Step S1040 includes displaying on a display a representation of the binary indication and receiving via a GUI a user-identified indication whether the at least two trade lines are duplicates. Step S1050 includes training a classifier through circuitry with feedback from the user-identified indication. The classifier is a computer-implemented classifier. Step S1060 includes recording in the memory the binary indication whether the at least two trade lines are duplicates and when the at least two trade lines are duplicates, removing at least one of the at least two trade lines from the set of industry reports so as to de-duplicate a portion of the at least two trade lines. Step S1070 includes running the classifier with a processor as an intelligent proxy for subsequent de-duplication decisions.

Method 1000 can also include dividing data results of the comparing with other comparing steps to form a training set of data and a testing set of data. In one embodiment the training set of data contains at least 60% of the data results and the testing set of data contains not more than 40% of the data results.

Method 1000 can also include applying the training set of data to fit the classifier via a k-told cross-validation process, and testing an accuracy of the classifier via the testing set of data. Method 1000 can also include fitting with the circuitry a plurality of decision trees for an associated plurality of sub-samples of the data results. In one embodiment, the fitting is executed via an Extra Trees Classifier implemented by the circuitry.

In some embodiments of method 1000, a positive comparison of the one or more attributes of the at least two trade lines comprises blending of data by triggering a de-duplication of the portion of the at least two trade lines. In some embodiments of method 1000, a negative comparison of the one or more attributes of the at least two trade lines comprises keeping the at least two trade lines as distinct trade lines without blending of data.

In one embodiment of method 1000, the set of industry reports includes credit reports from different credit bureaus. In other embodiments of method 1000, the set of industry reports includes reports from one of electronic file archival reports, electronic indexing reports, census reporting reports, inventory recording reports, research organization reports, financial decision-making reports, and evaluation and achievement reporting reports.

In one embodiment, a supervised machine learning de-duplication system includes a communications interface configured to receive a set of industry reports from multiple industry sources. The system also includes processing circuitry configured to execute the steps of method 1000 described above. In another embodiment, a non-transitory computer-readable medium having stored thereon computer-readable instructions that when executed by circuitry performs the steps of method 1000 described above.

In the supervised machine learning de-duplication system, the one or more attributes can include one or more of an account number, an account type, a date of an account opening, a data repository source, a high credit amount, a lost or stolen indicator, a bureau identity, a subscriber information, a balance, a payment amount, and a credit limit. The binary feature values for each attribute can take one of two values, 1 or 0; 1 indicating a match and 0 indicating a non-match. A comparison of the result of match produced by the classifier when compared to the result provided as input while training the classifier could indicate one of a true positive indicator, a true negative indicator, a false positive indicator, or a false negative indicator. An accuracy of the classifier is a function of a total sum of the true positive indicators and the true negative indicators, divided by a total sum of the true positive indicators, the false negative indicators, the false positive indicators, and the true negative indicators.

Embodiments described herein provide a tolerance to minor variations of matching features, as opposed to conventional decisions using pre-programmed instructions. Better accuracy in terms of reduced false positives and false negatives is achieved. Different metrics of accuracy can be gathered prior to rolling out new changes to production. Also, new features for comparison of two trade lines can be introduced to gather, fit, and/or predict a process of creating a classifier. This results in improved time-to-market utilization of new matching features for trade lines.

Embodiments herein have been described for de-duplication of trade lines primarily for merged credit reports. However, the blending and de-duplication systems and methods described herein can also be used in several other industries.

Archiving of electronic files can have numerous duplicates or near-duplicates, which can cause the total volume of files to be many times greater than necessary. Certain fields of a file can be compared against the same fields of another file to blend the data for two files and de-duplicate one of the two files.

Blending and de-duplication of indexes can also utilize the systems and methods described herein. Several indexes can be identical or near identical to other indexes, therein multiplying the total number of indexes. The blending and de-duplication systems and methods described herein can compare certain fields or tags of two indexes to blend and de-duplicate one of the indexes. This can result in a much more efficient and manageable indexing system.

A census bureau or other type of counting industry could benefit front the systems and methods of blending and de-duplication described herein. A uniform system could compare certain fields between two census reports to identify and de-duplicate identical or near identical census reports. An example of using embodiments described herein is a census count or report alter a major disaster which accounts for any missing, injured, or deceased individuals. Systems and methods of blending and de-duplication described herein could reduce or eliminate duplicated results by comparing specific fields within a uniform reporting template.

Inventory systems and methods could also benefit with the systems and methods of blending and de-duplication described herein. Many times, an inventory of items is conducted over a long period of time, such as an inventory of a warehouse or a store. Items are sold, moved, and/or restocked while the inventory process is active. A uniform inventory system and method could compare several fields between two inventory reports to identify two duplicate line items, and blend and de-duplicate one of the line items within the report.

Research activities within a large organization across several locations can be difficult to organize and harmonize. Many times, identical or near identical research of one group is being conducted with no knowledge of another group's research. A uniform research system can compare certain fields of two research reports to identify identical or near identical research trade lines, and blend and de-duplicate the second research report. This concept could also be extrapolated to other working groups to identify and eliminate duplicate activities. The resulting stream-lined work organization records can also assist in identifying areas in which a desired activity has been overlooked.

Financial organizations have a vast array of information available to assist in making sound investment and lending decisions. The blending and de-duplication systems and methods described herein can identity identical or near identical fields of two line items of a financial report, and blend and de-duplicate one of the line items. The resulting stream-lined reports are much more manageable for applying various algorithms to reach a decision.

Evaluation and achievement reports can utilize the blending and de-duplication systems and methods described herein. Examples of prospective groups include, but are not limited to high profile individuals, such as athletes, actors/actresses, and political candidates. A vast array of media information is available, much of which will include duplication of information. An algorithm can be used to unify the format of information, such that comparison of fields within multiple reports can be blended and de-duplicated across trade lines.

Numerous modifications and variations of the embodiments described herein are possible in light of the above disclosures. It is therefore to be understood that within the scope of the appended claims, the embodiments may be practiced otherwise than as specifically described herein.

The invention claimed is:

1. A computer-implemented method of de-duplicating data, the computer-implemented method having steps comprising:
   receiving data through a communications interface from a plurality of sources;
   comparing with circuitry one or more attributes of at least two sets of data to identify whether the at least two sets of data are duplicates;
   characterizing with the circuitry as a binary indication whether the comparing indicates the one or more attributes of the at least two sets of data are a match and storing the binary indication in a memory;
   displaying on a display a representation of the binary indication and receiving via a graphical user interface (GUI) a user-identified indication whether the at least two sets of data are duplicates;
   training a classifier through the circuitry with feedback from the user-identified indication, the classifier being a computer-implemented classifier;
   recording in the memory the binary indication whether the at least two sets of data are duplicates and when the at least two sets of data are duplicates, removing at least one of the at least two sets of data so as to de-duplicate a portion of the at least two sets of data; and
   running the classifier with a processor as an intelligent proxy for subsequent de-duplication decisions, wherein the binary indication includes one or more of a true positive indicator, a true negative indicator, a false positive, and a false negative indicator, and an accuracy of the classifier is a function of a total sum of the true positive indicators and the true negative indicators, divided by a total sum of the true positive indicators, the false negative indicators, the false positive indicators and the true negative indicators.

2. The computer-implemented method of claim 1, further comprising:
   dividing data results of the comparing with other comparing steps to form a training set of data and a testing set of data.

3. The computer-implemented method of claim 2, wherein the training set of data contains at least 60% of the data results and the testing set of data contains not more than 40% of the data results.

4. The computer-implemented method of claim 2, further comprising:
   applying the training set of data to fit the classifier via a k-fold cross-validation process; and
   testing an accuracy of the classifier via the testing set of data.

5. The computer-implemented method of claim 2, further comprising:
   fitting with the circuitry a plurality of decision trees for an associated plurality of subsamples of the data results.

6. The computer-implemented method of claim 5, wherein the fitting is executed via one of an Extra Trees Classifier, a Random Forest Classifier, or a Decision Tree Classifier implemented by the circuitry.

7. The computer-implemented method of claim 1, wherein a positive comparison of the one or more attributes of the at least two sets of data comprises blending of the data from the plurality of sources by triggering a de-duplication of the portion of the at least two sets of data.

8. The computer-implemented method of claim 1, wherein a negative comparison of the one or more attributes of the at least two sets of data comprises keeping the at least two sets of data as distinct sets of data without blending of the data from the plurality of sources.

9. The computer-implemented method of claim 1, wherein the data includes a plurality of credit reports from different credit bureaus.

10. The computer-implemented method of claim 1, wherein the data includes one or more reports from one of an electronic file archival report, an electronic indexing report, a census reporting report, an inventory recording report, a research organization report, a financial decision-making report, and an evaluation and achievement reporting report.

11. A supervised machine learning de-duplication system, comprising:
   a communications interface configured to receive data from a plurality of sources; and
   processing circuitry configured to
      compare one or more attributes of at least two sets of data to identify whether the at least two sets of data are duplicates,
      characterize as a binary indication whether the comparing indicates the one or more attributes of the at least two sets of data are a match and store in a memory the binary indication
      display on a display a representation of the binary indication and receive via a graphical user interface (GUI) a user-identified indication whether the at least two sets of data are duplicates,
      train a classifier with feedback from the user-identified indication, the classifier being a computer-implemented classifier,
      record in the memory the binary indication whether the at least two sets of data are duplicates and when the at least two sets of data are duplicates, remove at least one of the at least two sets of data so as to de-duplicate a portion of the at least two sets of data,
run the classifier with a processor as an intelligent proxy for subsequent de-duplication decisions dividing data results of the comparing with other comparing steps to form a training set of data and a testing set of data;
apply the training set of data to fit the classifier via a k-fold cross-validation process;
test an accuracy of the classifier via the testing set of data; and
fit a plurality of decision trees for an associated plurality of sub-samples of the data results.

12. The system of claim 11, wherein the processing circuitry is further configured to divide data results of the comparing with other comparing steps to form a training set of data and a testing set of data;
apply the training set of data to fit the classifier via a k-fold cross-validation process;
test an accuracy of the classifier via the testing set of data; and
fit a plurality of decision trees for an associated plurality of sub-samples of the data results.

13. The system of claim 11, wherein a positive comparison of the one or more attributes of the at least two sets of data indicates a redundancy of at least one of the at least two sets of data and triggers a de-duplication of the portion of the at least two sets of data.

14. The system of claim 11, wherein a negative comparison of the one or more attributes of the at least two sets of data indicates at most a partial redundancy and indicates the at least two sets of data should be kept as distinct sets of data without blending of the data from the plurality of sources.

15. The system of claim 11, wherein the data includes a plurality of credit reports from different credit bureaus.

16. The system of claim 15, wherein the one or more attributes include one or more of an account number, an account type, a date of an account opening, a data repository source, a high credit amount, a lost or stolen indicator, a bureau identity, a subscriber information, a balance, a payment amount, and a credit limit.

17. The system of claim 11, wherein the binary indication includes one or more of a true positive indicator, a true negative indicator, a false positive indicator, and a false negative indicator.

18. The system of claim 11, wherein an accuracy of the classifier is a function of a total sum of the true positive indicators and the true negative indicators, divided by a total sum of the true positive indicators, the false negative indicators, the false positive indicators, and the true negative indicators.

19. A non-transitory computer-readable storage medium having stored thereon computer-readable instructions that when executed by circuitry performs a method of de-duplicating data, the method having steps comprising:
receiving data through a communications interface from a plurality of sources;
comparing one or more attributes of at least two sets of data to identify whether the at least two sets of data are duplicates;
characterizing as a binary indication whether the comparing indicates the one or more attributes of the at least two sets of data are a match and storing in a memory the binary indication;
displaying on a display a representation of the binary indication and receiving via a graphical user interface (GUI) a user-identified indication whether the at least two sets of data are duplicates;
training a classifier with feedback from the user-identified indication, the classifier being a computer-implemented classifier;
recording in the memory the binary indication whether the at least two sets of data are duplicates and when the at least two sets of data are duplicates, removing at least one of the at least two sets of data so as to de-duplicate a portion of the at least two sets of data; and
running the classifier with a processor as an intelligent proxy for subsequent de-duplication decisions, wherein the binary indication includes one or more of a true positive indicator, a true negative indicator, a false positive, and a false negative indicator, and an accuracy of the classifier is a function of a total sum of the true positive indicators and the true negative indicators, divided by a total sum of the true positive indicators, the false negative indicators, the false positive indicators and the true negative indicators.

* * * * *